United States Patent Office 2,726,189
Patented Dec. 6, 1955

2,726,189
COMPOSITIONS AND METHODS FOR THE PRESERVATION OF TIMBER

Charles Donald Cook, Castleford, England, assignor to Hickson's Timber Impregnation Company (G. B.) Limited, Castleford, England, a British company No Drawing. Application June 19, 1951,
Serial No. 232,479

14 Claims. (Cl. 167—38.6)

This invention is concerned with improvements in and relating to compositions adapted for use in the preservation of timber. It has previously been proposed to incorporate dinitrophenols in wood preservative compositions and in particular a composition for the preservation of timber is known comprising sodium fluoride, sodium chromate or potassium dichromate, sodium arsenate and 2:4-dinitrophenol. We have now found that improved results are obtained by the use of compositions in some respects similar to those above mentioned, but using certain substituted aryl arsonic acids in place of the dinitrophenol. The resulting composition does not stain the wood to such an extent as does the prior composition, is more toxic to certain moulds, is less easily leached from wood than the prior composition, is more soluble in water thus facilitating application, and is toxic to various insects.

According to the invention therefore there is provided a composition adapted for use in the preservation of timber comprising an aryl arsonic acid of the general formula R AS O (OH)$_2$ or a water soluble salt thereof where R is an aromatic ring, for example benzene or toluene which is substituted by a nitro and/or one or more chloro groups, or is a naphthalene ring which may or may not be so substituted, together with one or more other substances which may or may not have wood preserving properties.

According to a further feature of the invention there is provided a composition adapted for use in the preservation of timber comprising an alkali metal or ammonium chromate or dichromate, an alkali metal or ammonium fluoride, an alkali metal or ammonium mono-, di-, or tri-arsenate and an aryl arsonic acid of the above general formula or a water-soluble salt thereof, preferably an alkali metal or ammonium salt. It will be understood that where salts of the stated arsonic acids are used these must be sufficiently water-soluble to enable them to be applied in the form of an aqueous solution.

Examples of suitable aryl arsonic acids of the above stated general formula are naphthyl arsonic acid, o-chlorphenyl arsonic acid, o-nitrophenyl arsonic acid and 2:5-dichlorphenyl arsonic acid. The aryl arsonic acids may for example be prepared by means of the so called Bart reaction (vide Organic Reactions vol. II–417–451 Wiley Ed. 1944). Preferably the composition according to the invention comprises from 3 to 12.5% of the aryl arsonic acid by weight.

A preferred composition according to the invention comprises sodium chromate or potassium dichromate, sodium fluoride, disodium hydrogen arsenate and 2:5-dichlorphenyl arsonic acid and examples of suitable mixtures comprising these ingredients are as follows:

| | Example 1 | Example 2 |
|---|---|---|
| | Percent by weight | Percent by weight |
| Sodium chromate | 37.5 | 21.0 |
| Sodium fluoride | 25 | 27.0 |
| Disodium hydrogen arsenate | 25 | 27.0 |
| 2:5-Dichlorphenyl arsonic acid | 12.5 | 5.0 |

It is preferable to choose proportions of the ingredients so that a 2% w./v. aqueous solution of the whole composition has a pH within the range of from 6.5–8.0 at 15.5° C.

The new composition may be used in the preservation of timber by any convenient method of impregnation as for example by means of a pressure process using a 2% aqueous solution of the composition which may be preceded by an initial vacuum or an initial air pressure or steaming process. If desired the process may be terminated by a final vacuum. The temperature of treatment may for example be atmospheric or higher, e. g. 60° C. Other examples of processes which may be used are the Lowry, Reuping and Boucherie processes, hot and cold soaking processes and dip and brush applications.

The invention also comprises the preservation of timber by treating it with an aqueous solution containing a compound of the general formula R AS O (OH)$_2$, where R has the above stated meaning.

The following results have been obtained by tests carried out with the composition of Example 1 above and are given only by way of illustration:

A sample of Baltic Redwood (*Pinus sylvestris*) was treated with a 2% solution of the above preferred composition using a vacuum-pressure method in such a way that the adsorption of the solution by the timber was equal to the weight of the timber.

The treated samples of Wood were then allowed to dry out in the air for two months. After this period the sample of timber was split into small pieces 3/16" x 3/16" x 3" and subjected to continuous leaching in a Soxhlet type of apparatus. The temperature of the wash water was about 50° C. The wash water was analysed quantiatively for extracted preservative, the wood after the leaching tests was examined for residual preservative and a representative portion of the timber before leaching was analysed for the adsorbed preservative content.

After 100 hours continuous leaching 50–75% of the 2:5-dichlorphenyl arsonic acid was retained in the wood. In a similar test carried out on the above mentioned prior composition, the dinitrophenol was substantially leached from the wood.

Experiments to test the toxicity of the preferred composition according to the invention as against the toxicity of the abovementioned prior composition were carried out by growing certain organisms in agar-agar culture containing varying percentages of the composition for 17 days using the method described in the report entitled "Standard Technique for Laboratory Tests on the Toxicity of Wood Preservations," October 1935 (Forest Products Research Laboratory, Princes Risborough, England). The results of such experiments carried out on *Coniophera cerebella* are given in Tables 1 and 2, Table 1 representing the growth of the fungus obtained with the composition according to the invention and Table 2, the growth obtained with the prior composition.

Table 1

| Test No. | Percentage of Composition | | | | | |
|---|---|---|---|---|---|---|
| | 0 | 0.04 | 0.02 | 0.01 | 0.005 | 0.002 |
| 1 | Full | None | None | None | Moderate | Fair. |
| 2 | do | do | do | Slight | do | Full. |
| 3 | do | do | do | None | Slight | Moderate. |
| 4 | do | do | do | Slight | Fair | Fair. |

Table 2

| Test No. | Percentage of Composition | | | | | |
|---|---|---|---|---|---|---|
| | 0 | 0.04 | 0.02 | 0.01 | 0.005 | 0.002 |
| 1 | Full | None | None | Diffuse | Slight | Full |
| 2 | do | do | Slight | Slight | do | Do |
| 3 | do | do | None | do | Moderate | Fair |
| 4 | do | Slight | Slight | do | Fair | Do |

Similar tests were carried out on the fungus *Lentinus lepideus* and the results are represented in Tables 3 and 4 Table 3 being the results obtained with the composition according to the invention:

Table 3

| Test No. | Percentage of Composition | | | | | |
|---|---|---|---|---|---|---|
| | 0 | 0.04 | 0.02 | 0.01 | 0.005 | 0.002 |
| 1 | Full | v. slight | slight | Moderate | Moderate | Fair |
| 2 | do | do | do | Slight | do | Do |
| 3 | do | do | do | do | do | Do |
| 4 | do | do | do | Moderate | do | Do |

Table 4

| Test No. | Percentage of Composition | | | | | |
|---|---|---|---|---|---|---|
| | 0 | 0.04 | 0.02 | 0.01 | 0.005 | 0.002 |
| 1 | Full | Moderate | Moderate | Fair | Diffuse | Full |
| 2 | do | Slight | do | do | do | Do |
| 3 | do | do | do | do | do | Do |
| 4 | do | Moderate | do | do | do | Do |

It will be seen from the foregoing that the composition according to the invention is considerably more effective in retarding the growth of the two well-known wood-attacking fungi than the said known composition.

By reason of its light colour and little tendency to "bleed" wood preserved with the composition according to the invention is suitable for the manufacture of such articles where staining difficulties are experienced as a result of "bleeding" from wood preserved with the said prior composition.

I claim:

1. A composition for preserving timber against fungus growth which comprises, a member selected from the group consisting of naphthyl arsonic acid, monochlorphenylarsonic acids, mononitrophenylarsonic acids, dichlorphenyl arsonic acids and water soluble metal and ammonium salts of said acids, said phenyl arsonic acids being otherwise unsubstituted; a member selected from the group consisting of alkali chromoates, alkali dichromates, ammonium chromate and ammonium dichromate; a member selected from the group consisting of alkali and ammonium fluorides and a member selected from the group consisting of alkali and ammonium mono-, di- and tri-arsenates.

2. The composition defined in claim 1 in which the proportion of said arsonic acid in said composition is within the range of from 3 to 12.5% by weight.

3. The composition defined in claim 1 in which said arsonic acid is naphthyl arsonic acid.

4. The composition defined in claim 3 in which said naphthyl arsonic acid in said composition is within the range of from 3 to 12.5% by weight.

5. The composition defined in claim 1 in which said arsonic acid is o-chlorphenyl arsonic acid.

6. The composition defined in claim 5 in which said o-chlorphenyl arsonic acid in said composition is within the range of from 3 to 12.5% by weight.

7. The composition defined in claim 1 in which said arsonic acid is o-nitrophenyl arsonic acid.

8. The composition defined in claim 7 in which said o-nitrophenyl arsonic acid in said composition is within the range of from 3 to 12.5% by weight.

9. The composition defined in claim 1 in which said arsonic acid is 2:5-dichlorphenyl arsonic acid.

10. The composition defined in claim 9 in which said 2:5-dichlorphenyl arsonic acid in said composition is within the range of from 3 to 12.5% by weight.

11. A composition for preserving timber against fungus growth which comprises, 3 to 12.5% by weight of 2:5-dichlorphenyl arsonic acid; 37.5 to 41% by weight of sodium chromate; 25 to 27% by weight of sodium fluoride; and 25 to 27% by weight of disodium hydrogen arsenate.

12. The method of preserving timber which comprises impregnating said timber with an aqueous solution of a composition comprising a member selected from the group consisting of naphthyl arsonic acid, monochlorphenylarsonic acids, mononitrophenylarsonic acids; 2:5-dichlorphenyl arsonic acid and water soluble salts of said acids, said monochlorphenylarsonic acids and said mononitrophenylarsonic acids being unsubstituted except by the chloro and nitro groups, respectively; a member selected from the group consisting of alkali chromates, alkali dichromates, ammonium chromate and ammonium dichromate; a member selected from the group consisting of alkali and ammonium fluorides and a member selected from the group consisting of alkali and ammonium mono-, di- and tri-arsenates.

13. The method of preserving timber which comprises impregnating said timber with an aqueous solution of a composition comprising a member selected from the group consisting of 2:5-dichlorphenyl arsonic acid and water soluble salts thereof; a member selected from the group consisting of alkali chromates, alkali dichromates, ammonium chromate and ammonium dichromate; a member selected from the group consisting of alkali and ammonium fluorides and a member selected from the group consisting of alkali and ammonium mono-, di- and tri-arsenates.

14. The method of preserving timber which comprises impregnating said timber with an aqueous solution of a composition comprising a member of the group consisting of o-chlorphenyl arsonic acid and water soluble salts thereof; a member selected from the group consisting of alkali chromates, alkali dichromates, ammonium chromate and ammonium dichromate; a member selected from the group consisting of alkali and ammonium fluorides and a member selected from the group consisting of alkali and ammonium mono-, di- and tri-arsenates.

References Cited in the file of this patent

UNITED STATES PATENTS

| 1,758,958 | McQuaid | May 20, 1930 |
| 1,957,872 | Wolman | May 8, 1934 |
| 1,957,873 | Wolman | May 8, 1934 |
| 2,449,080 | Mayfield | Sept. 14, 1948 |
| 2,450,866 | Morehouse | Oct. 5, 1948 |
| 2,476,890 | Morehouse | July 19, 1949 |

FOREIGN PATENTS

| 126,598 | Austria | Jan. 25, 1932 |

OTHER REFERENCES

Wood Preservation by Van Groenau et al., published in Holland, 1951, pgs. 142–146, 152 and 153.

Jour. of Eco. Ento. for Dec. 1947, pgs. 883–895, inclusive (article by H. Y. Fan).